(12) United States Patent
Goodson et al.

(10) Patent No.: US 9,191,495 B2
(45) Date of Patent: *Nov. 17, 2015

(54) SYSTEMS AND METHODS FOR COMMUNICATING VECTORING STREAMS IN MULTI-CARD VECTORING GROUPS

(75) Inventors: Richard Goodson, Huntsville, AL (US); Arlynn Wayne Wilson, Huntsville, AL (US); Fred Chu, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/410,712

(22) Filed: Mar. 2, 2012

(65) Prior Publication Data

US 2012/0243404 A1 Sep. 27, 2012

Related U.S. Application Data

(60) Provisional application No. 61/448,546, filed on Mar. 2, 2011.

(51) Int. Cl.
| | |
|---|---|
| *H04L 29/14* | (2006.01) |
| *H04M 3/18* | (2006.01) |
| *H04W 24/02* | (2009.01) |
| *H04B 3/32* | (2006.01) |
| *H04M 3/34* | (2006.01) |
| *H04L 27/26* | (2006.01) |

(Continued)

(52) U.S. Cl.
CPC . *H04M 3/18* (2013.01); *H04B 3/32* (2013.01); *H04L 27/2601* (2013.01); *H04M 3/34* (2013.01); *H04W 24/02* (2013.01); *H04L 2012/5675* (2013.01); *H04M 3/306* (2013.01)

(58) Field of Classification Search
CPC .............. H04B 3/32; H04L 2012/5675; H04L 27/2601; H04M 3/34; H04W 24/02
USPC .......................................... 370/222–224, 201
See application file for complete search history.

(56) References Cited

U.S. PATENT DOCUMENTS 6,836,509 B1 * 12/2004 Nordin et al. ................. 375/220
7,184,396 B1    2/2007 Li
(Continued)

FOREIGN PATENT DOCUMENTS

EP        2464026      6/2012
WO     2009152188   12/2009

OTHER PUBLICATIONS

Genesis Tech. Systems, "Bonded DSL Rings", 2007.*
(Continued)

*Primary Examiner* — Khaled Kassim
*Assistant Examiner* — Zhaohui Yang
(74) *Attorney, Agent, or Firm* — Maynard Cooper & Gale, P.C.; Jon E. Holland

(57) ABSTRACT

A communication system comprises a plurality of line cards having transceivers coupled to a plurality of subscriber lines. Each line card has at least one active transceiver within the same vectoring group, and each line card also has vector logic capable of cancelling crosstalk induced by an active transceiver that is a member of the vectoring group. Further, the line cards are coupled to one another via a ring connection across which vectoring information is passed from one line card to the next. In the event of a failure of one of the line cards, the failed card is bypassed by the vectoring stream so that the operational line cards can continue crosstalk vectoring operations despite such failure.

12 Claims, 7 Drawing Sheets

(51) Int. Cl.
   *H04L 12/70* (2013.01)
   *H04M 3/30* (2006.01)

(56) References Cited

U.S. PATENT DOCUMENTS

| | | | |
|---|---|---|---|
| 7,317,681 | B1 | 1/2008 | Ben-Dvora et al. |
| 8,411,696 | B1* | 4/2013 | Ko et al. .................... 370/419 |
| 8,605,567 | B2 | 12/2013 | Wilkes et al. |
| 2002/0126689 | A1* | 9/2002 | Redington ................. 370/442 |
| 2003/0012129 | A1* | 1/2003 | Lee et al. .................. 370/216 |
| 2003/0086514 | A1 | 5/2003 | Ginis et al. |
| 2004/0223503 | A1 | 11/2004 | Lynch et al. |
| 2006/0008271 | A1 | 1/2006 | Chiang et al. |
| 2006/0115268 | A1 | 6/2006 | Zirnheld et al. |
| 2006/0215546 | A1 | 9/2006 | Tochio |
| 2008/0131122 | A1 | 6/2008 | Reisslein et al. |
| 2009/0296569 | A1 | 12/2009 | Ramalho Ribeiro et al. |
| 2009/0304056 | A1* | 12/2009 | De Lind Van Wijngaarden et al. ........................ 375/222 |
| 2009/0316717 | A1 | 12/2009 | Almalki |
| 2010/0214911 | A1* | 8/2010 | Cooke et al. ............... 370/229 |
| 2010/0329399 | A1* | 12/2010 | De Lind Van Wijngaarden ............. 375/346 |
| 2011/0063971 | A1 | 3/2011 | Tochio |
| 2012/0243404 | A1 | 9/2012 | Goodson et al. |
| 2012/0250490 | A1 | 10/2012 | Goodson et al. |

OTHER PUBLICATIONS

Heath, "Profitable IPTV with DSL Rings", 2009.*
ITU-T G.993.5, Self-FEXT cancellation (vectoring) for use with VDSL2 transceivers, published in Apr. 2010.*
Ginis et al., Vectored DSL to the Rescue, OSP Magazine, published before Sep. 16, 2010.*
Heath, James, "Profitable IPTV with DSL Rings", iptvmagazine, 2009.
ITU-T G.993.5, "Self-FEXT Cancellation (Vectoring) for use with VDSL2 Transceivers", International Telecommunications Union, Apr. 2010.
Genesis Technical Systems, "Bonded DSL Rings", 2007.

* cited by examiner

US 9,191,495 B2

SYSTEMS AND METHODS FOR COMMUNICATING VECTORING STREAMS IN MULTI-CARD VECTORING GROUPS

CROSS REFERENCE TO RELATED APPLICATION

This application claims priority to U.S. patent application Ser. No. 61/448,546, entitled "Generalized Vectoring Architecture" and filed on Mar. 2, 2011, which is incorporated herein by reference.

RELATED ART

A digital subscriber line access multiplexer (DSLAM) is a device that connects multiple subscriber lines to a high-speed network line using digital subscriber line (DSL) modulation formats across the subscriber lines. In the downstream direction, a DSLAM generally demultiplexes a high-speed data stream from a network across the subscriber lines, and in the upstream direction, a DSLAM generally multiplexes the data streams from the subscriber lines for transmission across the high-speed network line. A DSLAM can be installed at a variety of locations, such as at a network facility (e.g., a central office) or an intermediate point between a central office and one or more customer premises.

A variety of DSL formats have been used for the communication from a DSLAM to a customer premises. Very-high-bit-rate DSL (VDSL) is a solution that is attractive due to the relatively high data rates enabled by VDSL as compared to other DSL solutions. Indeed, first generation VDSL provides data transmission up to about 52 Mega-bits per second (Mbit/s) downstream and about 16 Mbit/s upstream. Second generation VDSL, sometimes referred to as VDSL2, provides up to about 100 Mbit/s simultaneously in the both the upstream and downstream directions. The VDSL line code is discrete multi-tone (DMT) modulation, which uses a sequence of equally spaced frequencies or tones, each of which is modulated using quadrature amplitude modulation (QAM).

Like several other DSL technologies, VDSL suffers from the effects of crosstalk. However, VDSL standards specify vectoring techniques that allow crosstalk cancellation, and such techniques have been employed to cancel the crosstalk among subscriber lines extending from a DSLAM to one or more customer premises in an effort to improve the performance of VDSL signals and allow for longer reaches. However, VDSL vectoring is processing intensive, and as the number of subscriber lines increases, the amount of processing required to cancel crosstalk from the signals carried by the subscriber lines increases exponentially.

In this regard, to cancel crosstalk, vector logic (sometimes referred to as a "vector engine") maintains a set of vectoring coefficients respectively corresponding to the coupling functions between interfering tones (i.e., tones that induce crosstalk) and victim tones (i.e., tones affected by crosstalk). For each victim tone, the vector engine combines the symbol of the victim tone and each interfering tone with its corresponding vectoring coefficient, and the result becomes the new victim tone. In such manner, the crosstalk channel is effectively inverted, and the crosstalk is cancelled tone-by-tone for all tones. For transmitter-based precoding, the new victim tone is transmitted on the line, and the precoding effectively cancels the crosstalk as the victim tone propagates across the line and the crosstalk couples into the line of the victim tone. For receiver-based cancellation, the new tone is further processed by the receiver but with reduced crosstalk.

A single vector engine can process the coefficients for a limited number of tones, but additional vector engines can be added in order to increase the number of tones subject to the VDSL vectoring. In such case, the vector engines share vectoring information (e.g., tone symbols) so that a larger number of interfering tones can be canceled from each victim tone.

When a vectoring group spans across multiple line cards, the vectoring information should be communicated among the line cards. Reliably communicating vectoring information among multiple line cards can be problematic, particularly for vectoring groups that process a large number of tones thereby generating a large amount of vectoring information.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for communicating vectoring information for multi-card vectoring groups. In one exemplary embodiment, a communication system comprises a plurality of line cards having transceivers coupled to a plurality of subscriber lines. Each line card has at least one active transceiver within the vectoring group, and each line card also has vector logic capable of cancelling crosstalk induced by an active transceiver that is a member of the vectoring group. Further, the line cards are coupled to one another via a ring connection across which vectoring information is passed from one line card to the next. In this regard, the ring connection carries a data stream, referred to hereafter as "vectoring stream," having a plurality of time slots respectively allocated to the line cards. As the vectoring stream is communicated, each line card inserts vectoring information (e.g., the symbols received by such line card from the subscriber lines or to be transmitted by such line card across the subscriber lines) into the time slots allocated to it. Further, each line card reads the vectoring information of other line cards from the time slots allocated to the other line cards. Accordingly, the vector logic on a given line card has sufficient access to the vectoring information of the other line cards to cancel crosstalk induced by interfering tones communicated across any of the subscriber lines regardless of which line cards receive or transmit the interfering tones. In the event of a failure of one of the line cards, the failed card is bypassed by the vectoring stream so that the operational line cards can continue crosstalk vectoring operations despite such failure.

Figure 1:
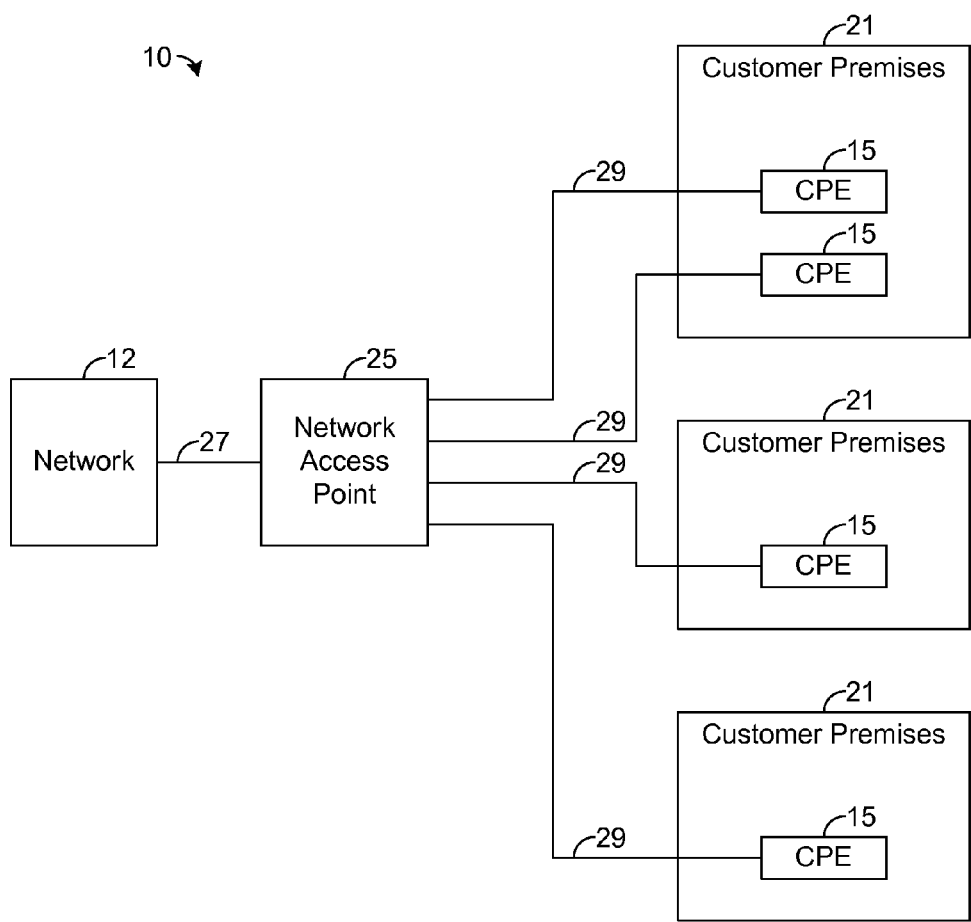
FIG. 1 is a block diagram illustrating an exemplary embodiment of a communication system.

FIG. 1 depicts an exemplary embodiment of a communication system 10. As shown by FIG. 1, the system 10 comprises a network 12, such as the public switched telephone network (PSTN) or other communication network, configured to communicate with CPE 15 at one or more customer premises 21. In this regard, the network 12 is coupled to a network access point 25 via a network line 27, such as one or more twisted-wire pairs or optical fibers, and the network access point 25 is coupled to the CPE 15 via a plurality of subscriber lines 29, such as twisted-wire pairs or optical fibers. For simplicity, FIG. 1 depicts four subscriber lines 29, but there can be any number of subscriber lines 29 in other embodiments. Further, the lines 29 in FIG. 3 extend to multiple customer premises 21, but it is also possible for the lines 29 to extend to a single customer premises 21.

In a downstream direction, the network access point 25 receives a high-speed data stream from the network 12 via the network line 27 and forwards packets from the high-speed data stream across the plurality of subscriber lines 29. In an upstream direction, the network access point 25 receives data streams from the customer premises 21 via the subscriber lines 29 and transmits packets from such data streams across the network line 27 to the network 12.

In one exemplary embodiment, the network line 27 comprises an optical fiber, and optical modulation formats are used to communicate data across the fiber. In addition, each subscriber line 29 comprises at least one twisted-wire pair, and digital subscriber line (DSL) modulation formats are used to communicate data across the subscriber lines 29. Note that there are a variety of DSL modulation formats that may be used for communicating data across the subscriber lines 29, such as asymmetric DSL (ADSL), high-bit-rate DSL (HDSL), very-high-bit-rate DSL (VDSL), and single-pair HDSL (SHDSL). For illustrative purposes, it will be assumed hereafter that the modulation format used for each subscriber line is VDSL, such as first generation VDSL or VDSL2, but it should be emphasized that other DSL and/or non-DSL modulation formats may be used in other embodiments.

Figure 2:
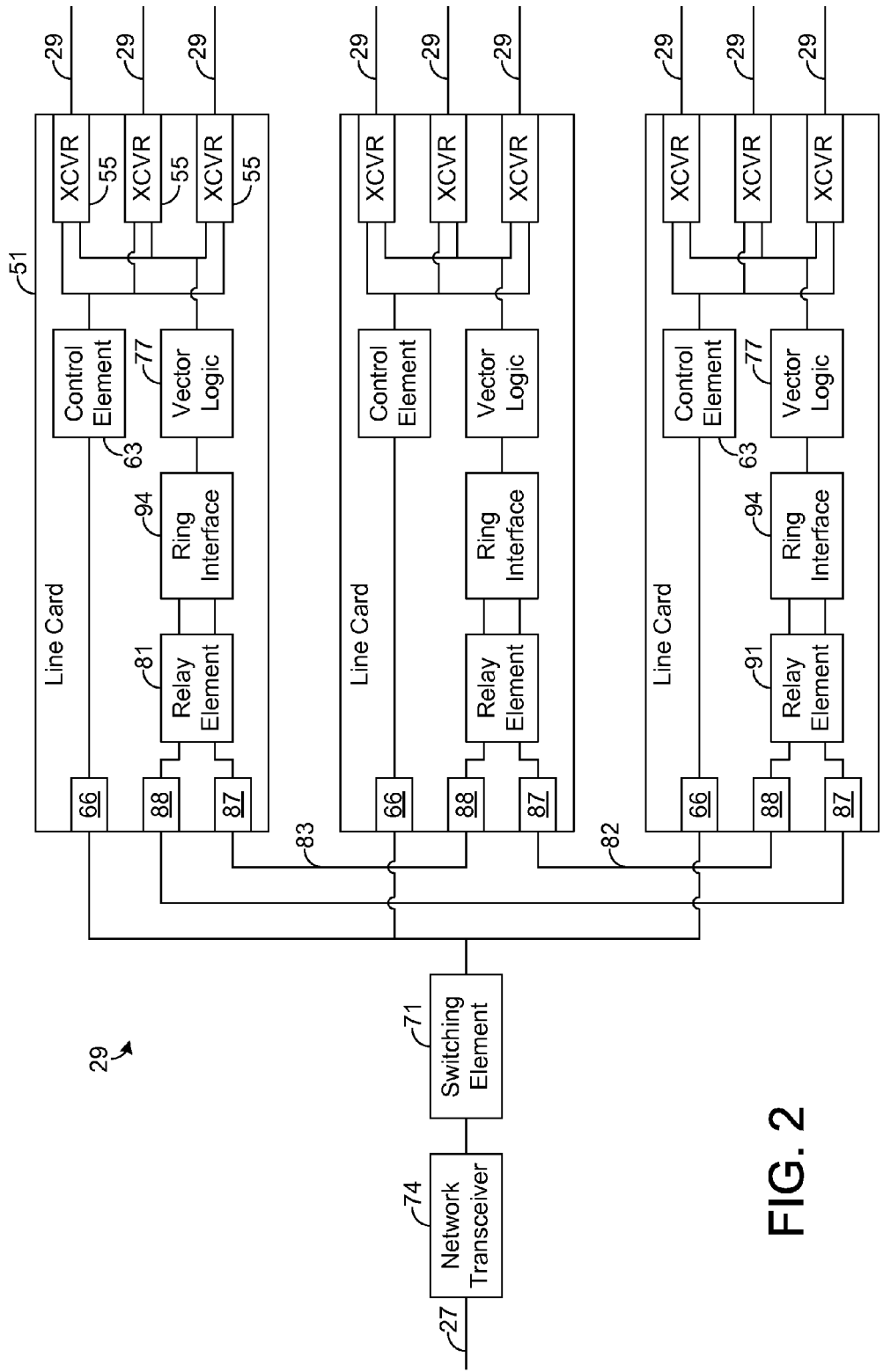
FIG. 2 is a block diagram illustrating an exemplary embodiment of a network access point, such as is depicted by FIG. 1.

FIG. 2 depicts an exemplary embodiment of the network access point 25. The network access point 25 comprises a plurality of line cards 51-53 coupled to the subscriber lines 29. In this regard, each line card 51-53 has at least one transceiver 55 coupled to at least one subscriber line 29. In the exemplary embodiment shown by FIG. 2, each line card 51-53 has three transceivers 55 respectively coupled to three subscriber lines 29, but any line card 51-53 may have any number of transceivers 55 and/or be coupled to any number of subscriber lines 29 in other embodiments. Further, it is unnecessary for each line card 51-53 to have the same number of transceivers 55 and be coupled to the same number of subscriber lines 29 as the other line cards. As will be described in more detail hereafter, each transceiver 55 is a member of the same vectoring group, but it is unnecessary for all of the transceivers 55 to be members of the same vectoring group in other embodiments. In one exemplary embodiment, the components of the same line card reside on a single printed circuit board (PCB), but it is possible for any line card to have more than one PCB, if desired.

As shown by FIG. 2, each line card 51-53 has a card control element 63 that is coupled to each transceiver 55 residing on the same line card 51-53. The card control element 63 controls the general operation of the line card 51-53 on which it resides, including the forwarding of data packets, as will be described in more detail hereafter. The card control element 63 may be implemented in hardware, software, firmware, or any combination thereof. Each card control element 63 is also coupled to a port 66, referred to hereafter as a "network-side port," which is coupled to a switching element 71. Further, the switching element 71 is coupled to a network transceiver 74 that is coupled to the network line 27.

In the downstream direction, assuming that the network line 27 comprises an optical fiber, the network transceiver 74 receives an optical data signal from the network line 27 and converts the optical data signal into an electrical signal comprising data packets. The switching element 71 is configured to forward the data packets to the line cards 51-53 based on header information within the data packets using forwarding techniques known in the art. Each data packet received by a line card 51-53 is received by the card's control element 63, which forwards the packet to at least one transceiver 55 for transmission across at least one subscriber line 29. When a transceiver 55 receives data packets from the card control element 63, the transceiver 55 modulates a carrier signal with the data packets using VDSL or some other desired modulation format in order to form a data signal that is transmitted across the subscriber line 29 coupled to such transceiver 55.

In the upstream direction, the transceivers 55 receive modulated data signals from the subscriber lines 29. For a given signal received by a given transceiver 55, the transceiver 55 demodulates the received signal to recover data packets. The transceiver 55 forwards the data packets to the card control element 63 that is residing on the same line card 51-53, and the card control element 63 forwards each packet received from the card's transceivers 55 to the switching element 71. The switching element 71 combines the packets received from all of the line cards 51-53 into a high-speed data stream, which is received by the network transceiver 74. Assuming that the network line 27 comprises an optical fiber, the network transceiver 74 converts the received data stream into an optical data signal for transmission across the network line 27 to the network 12 (FIG. 1).

As shown by FIG. 2, each line card 51-53 comprises vector logic 77 (e.g., one or more vector engines) configured to perform crosstalk vectoring in order to cancel crosstalk from the tones transmitted and/or received by the card 51-53 on which it resides. For example, the vector logic 77 of the line card 51 maintains vectoring coefficients for the tones communicated (i.e., transmitted or received) by the transceivers 55 of the card 51. Via known techniques, the vector logic 77 uses such vectoring coefficients to estimate crosstalk that affects the received tones or that will affect tones to be transmitted so that such crosstalk can be cancelled.

For example, the vector logic 77 of the card 51 stores sets of vectoring coefficients respectively corresponding to the tones communicated across the subscriber lines 29 coupled to the card 51. For a given tone, referred to in this example as "victim tone," received by one of the transceivers 55 from one of the subscriber lines 29, the corresponding set of vectoring coefficients includes vectoring coefficients respectively associated with the tones, referred to as "interfering tones," that interfere with the victim tone. Upon receiving a set of symbols simultaneously communicated across the subscriber lines 29, the transceivers 55 of the card 51 send such symbols to the vector logic 77 of the card 51. For each interfering tone, the vector logic 77 combines (e.g., multiplies) the tone's symbol with the associated vectoring coefficient to estimate an amount of crosstalk interference from the interfering tone affecting the victim tone. The vector logic 77 then cancels such crosstalk interference from the symbol of the victim tone by combining (e.g., subtracting) the estimate with the symbol of the victim tone. The vector logic 77 performs the same process for the symbols of the other interfering tones in order to cancel, tone-by-tone, crosstalk interference in the victim tone.

After removing the crosstalk interference induced by the interfering tones, the vector logic 77 sends the symbol of the victim tone back to the transceiver 55 that originally received it from a subscriber line 29. Such transceiver 55 decodes the symbol and generates an error signal indicating an error estimate for the symbol. The foregoing transceiver 55 sends the error signal to the vector logic 77, which adaptively updates the set of vectoring coefficients corresponding to the victim tone based on the error signal using a known coefficient update algorithm, such as least means square (LMS).

Thus, the vector logic 77 of the card 51 cancels, from the symbol of the victim tone, crosstalk induced by each interfering tone received by the card 51 from the subscriber lines 29. In one exemplary embodiment, the vector logic 77 uses the same techniques to cancel, from the symbol of the victim tone, crosstalk induced by interfering tones received by the other line cards 52 and 53. In this regard, the set of vectoring coefficients corresponding to the victim tone also includes vectoring coefficients associated with the tones received by the cards 52 and 53. As described above for the symbols received by the card 51, the vector logic 77 combines the symbols received by the transceivers 55 of the line cards 52 and 53 with the associated vectoring coefficients to estimate the amount of crosstalk induced by such symbols in the symbol of the victim tone. The vector logic 77 also combines such estimates with the symbol of the victim tone to cancel, tone-by-tone, the crosstalk induced by the interfering tones received by the line cards 52 and 53.

Further, such vector logic 77 uses similar techniques to precode the symbols transmitted by the transceivers 55 of the card 51 across the subscriber lines 29 such that crosstalk is cancelled as the symbols propagate across the subscriber lines 29. Specifically, the vector logic 77 receives symbols of interfering tones to be communicated across the lines 29 at the same time as a symbol of a victim tone to be communicated by the line card 51. For each interfering tone, the vector logic 77 combines (e.g., multiplies) the tone's symbol with the associated vectoring coefficient to estimate an amount of crosstalk interference that will affect the symbol of the victim tone. The vector logic 77 then combines (e.g., subtracts) the estimate from the symbol of the victim tone in order to precode the symbol so that crosstalk interference from the interfering tone is effectively cancelled during communication as it couples into the line 29 of the victim tone. The vectoring coefficients used for the precoding are updated based on the error associated with the victim tone, as determined by the CP transceiver 15 (FIG. 1) that receives the victim tone. Exemplary techniques for performing crosstalk vectoring, including symbol precoding, are described in commonly-assigned U.S. patent application Ser. No. 13/016,680, entitled "Systems and Methods for Cancelling Crosstalk in Satellite Access Devices" and filed on Jan. 28, 2011, which is incorporated herein by references. Note that the vector logics 77 of the other line cards 52 and 53 are configured similar to the vector logic 77 of the line card 51 in order to cancel crosstalk affecting the tones communicated by the lines cards 52 and 53, respectively.

Moreover, in one exemplary embodiment, the vector logic 77 and transceivers 55 of the line cards 51-53 form a vectoring group such that crosstalk from any interfering tone communicated across the subscriber lines 29 can be cancelled from any victim tone communicated across the subscriber lines 29. However, in other embodiments, it is unnecessary for each vector logic 77 and each transceiver 55 at the network access point 25 to be a member of the same vectoring group.

In order to enable each line card 51-53 to cancel crosstalk induced by tones communicated by the other line cards, vectoring information (e.g., tone symbols) is passed from one card to the other. For example, to enable the vector logic 77 of the line card 51 to cancel, from a victim tone received by the line card 51, crosstalk induced by interfering tones received by the line card 53, the line card 53 transmits symbols of the interfering tones to the line card 51. Similarly, to enable the vector logic 77 of the line card 51 to precode the symbols transmitted by the transceivers 55 of the line card 51 such that crosstalk induced by interfering tones transmit by line card 53 is cancelled as the symbols propagate across the subscriber lines 29, the line card 53 transmits symbols of the interfering tones to the line card 51. In one exemplary, a ring connection 80 comprising a plurality of segments 81-83 is configured to carry vectoring information from card-to-card. In this regard, each line card 51-53 has a plurality of ports 87 and 88, referred to hereafter as "ring ports," respectively coupled to a plurality of segments of the ring connection 80. For example, the ring port 87 of the line card 51 is coupled to one end of the segment 83, and the other end of the segment 83 is coupled to the ring port 88 of the line card 52. Further, the ring port 87 of the line card 52 is coupled to one end of the segment 82, and the other end of the segment 82 is coupled to the ring port 88 of the line card 53. Also, the ring port 87 of the line card 53 is coupled to one end of the segment 81, and the other end of the segment 81 is coupled to the ring port 88 of the line card 51.

As shown by FIG. 2, each ring port 87 and 88 of a given line card 51-53 is coupled to a relay element 91, and the relay element 91 is coupled to and controlled by a ring interface 94, which is coupled to the card's vector logic 77. The ring interface 94 may be implemented in hardware, software, firmware, or any combination thereof.

The relay element 91 of a given line card 51-53 is configured to transition between a state, referred to herein as the "bypass state," and a state, referred to herein as the "pass-through state." In the bypass state, the relay element 91 is configured to short the ring ports 87 and 88 such that the data carried by the ring connection 80 effectively bypasses the logic on the card 51-53 on which the relay element 91 resides. That is, the relay element 91 electrically couples the ring port 88 directly to the ring port 87. Thus, when the relay element 91 of a given card 51-53 is in the bypass state, the data received from one ring port 87 or 88 is passed directly to the other ring port of the same card thereby bypassing the logic (e.g., ring interface 94 and vector logic 77) of the same card.

In the pass-through state, the relay element 91 electrically couples each ring port 87 and 88 to the ring interface 94. Thus, the vectoring information carried by the ring connection 80 is received and processed by the ring interface 94. Ultimately, such information is used by the vector logic 77 to perform crosstalk vectoring operations.

Figure 3:
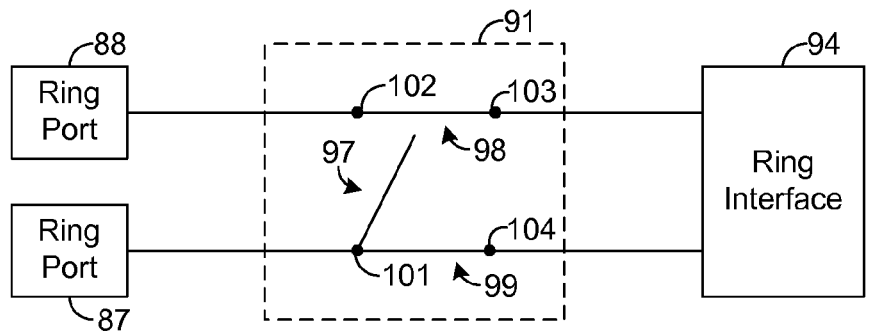
FIG. 3 is a block diagram illustrating an exemplary embodiment of a relay element, such as is depicted by FIG. 2, while the relay element is in a pass-through state.

FIG. 3 depicts an exemplary embodiment of the relay element 91, which is shown to be in the pass-through state. The exemplary relay element 91 has a plurality of switches 97-99, which will be described in more detail below. Each switch 97-99 is configured to transition between two states, referred to herein as the "open state" and the "closed state." When in the open state, the switch 97-99 operates as an open circuit by preventing current from flowing. When in the closed state, the switch 97-99 operates as a short circuit by allowing current to flow.

When the switch 97 is in the closed state, the switch 97 electrically couples node 101 to node 102. In such state, the switch 97 provides a conductive path for the data carried by the ring connection 80 (FIG. 2) such that the data bypasses the ring interface 94 and, hence, the other logic residing on the same line card, such as the vector logic 77 (FIG. 2). However, in FIG. 3, the switch 97 is shown in the open state such that the relay element 91 does not provide a conductive path directly between the nodes 101 and 102.

In FIG. 3, the switch 98 is in the closed state and, therefore, electrically couples the node 102 to a node 103, thereby providing a conductive path from the ring port 88 to the ring interface 94. Further, the switch 99 is also in the closed state and, therefore, electrically couples the node 101 to a node 104, thereby providing a conductive path from the ring port 87 to the ring interface 94. Accordingly, when the relay element 91 is in the pass-through state, as shown by FIG. 3, the data carried by the ring connection 80 (FIG. 2) passes through the relay element 91 to the ring interface 94.

Figure 4:
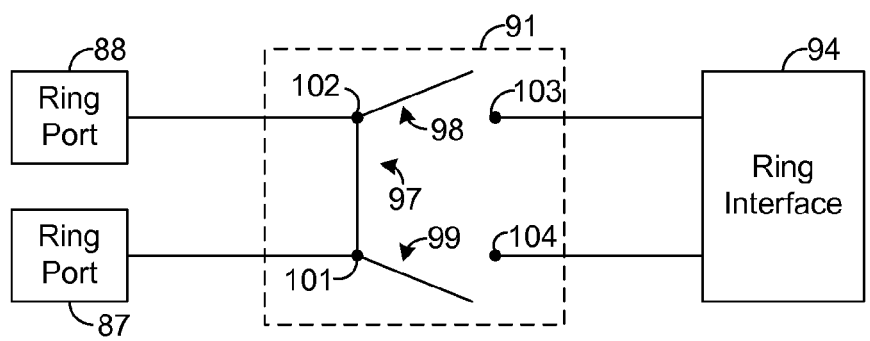
FIG. 4 is a block diagram illustrating an exemplary embodiment of a relay element, such as is depicted by FIG. 3, while the relay element is in a bypass state.

FIG. 4 depicts an exemplary embodiment of the relay element 91 after it has been transitioned to the bypass state. In FIG. 4, the switches 98 and 99 are both in the open state such that the node 102 is electrically isolated from the node 103 and such that the node 101 is electrically isolated from the node 103. Thus, the data carried by the ring connection 80 (FIG. 2) is prevented from passing through the relay element 91 to the ring interface 94. Further, as shown by FIG. 4, the switch 97 is in the closed state such that the node 101 is electrically coupled to the node 102. Accordingly, when the relay element 91 is in the bypass state, as shown by FIG. 4, the data carried by the ring connection 80 (FIG. 2) passes through the relay element 91 from one ring port 87 or 88 to the other such that the data bypasses the ring interface 94 and, hence, the other logic residing on the same card, such as the vector logic 77 (FIG. 2). For example, if data is received by the ring port 88, such data flows through the closed switch 97 to the ring port 87, and if data is received by the ring port 87, such data flows through the closed switch 97 to the ring port 88.

In one exemplary embodiment, the vectoring stream carried by the ring connection 80 (FIG. 2) has time slots that are respectively allocated to the line cards 51-53, and each line card 51-53 inserts into the slots allocated to it vectoring information for enabling the other line cards to cancel crosstalk. As an example, refer to FIG. 5, which depicts an exemplary embodiment of a vectoring stream 125 carried by the ring connection 80. In this regard, the vectoring stream 125 comprises a field 131 allocated to the line card 51, a field 132 allocated to the line card 52, and a field 133 allocated to the line card 53. Each line card 51-53 is configured to insert vectoring information into the slots of the respective field 131-133 allocated to it, and the fields 131-133 shall be referred to herein as "vectoring fields."

For example, the vector logic 77 of the line card 51 is configured to transmit to the card's ring interface 77 the symbols of the tones communicated across the subscriber lines 29 coupled to the card 51. The ring interface 94 is configured to insert such symbols into the slots of the vectoring field 131 allocated to the card 51. The vector logics 77 of the other cards 52 and 53 are configured to use such symbols to cancel crosstalk. As an example, the vector logic 77 of the line card 52 may use the symbols in the vectoring field 131 to cancel crosstalk induced by the interfering tones received by the line card 51 from the subscriber lines 29 coupled to such card 51. Further, the vector logic of the line card 52 may use the symbols in the vectoring field 131 to precode the symbols transmitted by the transceivers 55 of the line card 52 such that crosstalk induced by interfering tones transmitted by the line card 51 is cancelled as the symbols propagate across the subscriber lines 29. Similarly, the other cards 52 and 53 are configured to insert symbols into the vectoring fields 132 and 133, respectively, allocated to such cards 52 and 53. Thus, the data carried by the ring connection 80 provides the symbols communicated across all of the subscriber lines 29 associated with the vectoring group so that each card 51-53 can cancel crosstalk induced by an interfering tone communicated by any subscriber line 29, regardless of which card 51-53 actually transmits or receives the interfering tone via the subscriber lines 29.

Figure 5:
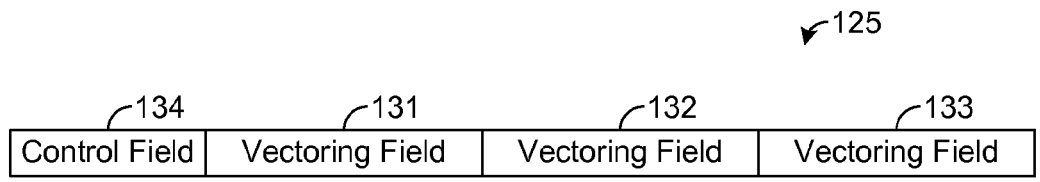
FIG. 5 is a block diagram illustrating an exemplary vectoring stream communicated across a ring connection, such as is depicted by FIG. 2.

As shown by FIG. 5, the vectoring stream 125 also comprises a field 134, referred to hereafter as "control field," that may be used by the line cards 51-53 to transmit control information among the cards 51-53, as will be described in more detail hereafter. In one exemplary embodiment, the vectoring stream 125 is transmitted across the ring connection 80 (FIG. 2) from card-to-card in the same direction around the ring formed by the ring connection 80 and cards 51-53. For example, referring to FIG. 2, the vectoring stream 125 may be transmitted from the line card 51 to the line card 52 via the segment 83, from the line card 52 to the line card 53 via the segment 82, and from the line card 53 to the line card 51 via the segment 81. Alternatively, the vectoring stream 125 may be transmitted from the line card 51 to the line card 53 via the segment 81, from the line card 53 to the line card 52 via the segment 82, and from the line card 52 to the line card 51 via the segment 83. In other embodiments, other techniques for communicating the vectoring stream 125 are possible. For example, as will be described in more detail hereafter, it is possible for the vectoring stream 125 to be transmitted in both directions, or for one portion of the vectoring stream 125 to be transmitted in one direction while another portion of the vectoring stream 125 is transmitted in the opposite direction. For illustrative purposes, it will be assumed hereafter that the vectoring stream 125 is transmitted in the same direction, clockwise, around the ring unless otherwise noted. Thus, unless otherwise noted, it will be assumed that the vectoring stream 125 propagates from the segment 81 to the segment 83 and then to the segment 82.

During operation, it is possible for a failure to occur on any line card 51-53. Depending on the type of failure that occurs, it is also possible that the failure may prevent the line card from being able to communicate the vectoring stream 125. However, in one exemplary embodiment, the continued transmission of the vectoring stream 125 despite a failure of any line card 51-53 is ensured via the relay elements 91. In this regard, the relay elements 91 are normally in the pass-through state. However, when a line card 51-53 fails such that it can no longer receive and/or transmit the vectoring stream 125 via the ring interface 94, the relay element 91 of the failed card is transitioned to the bypass state such that the vectoring stream 125 bypasses the failed line card. That is, for the failed line card, the vectoring stream 125 passes from the ring port 88 to the ring port 87 through the relay element 91 (assuming a clockwise data flow) without being received and/or processed by the ring interface 94. Thus, failure of the line card does not prevent successful communication of the vectoring stream 125 among the other line cards.

In one exemplary embodiment, the ring interface 94 of each line card 51-53 is configured to monitor the status of the line card on which it resides and to detect a failure of such card that prevents the ring interface 94 from successfully communicating the vectoring stream 125. In response to the detection of such a failure, the ring interface 94 is configured to control the relay element 91 such that it transitions from the pass-through state to the bypass state.

However, for some failures, the ring interface 94 may be prevented from controlling the state of the relay element 94. As an example, in one exemplary embodiment, each line card 51-53 has a power bus (not specifically shown) that carries electrical power to the circuitry of the line card, such as the transceivers 55, the control element 63, the vector logic 77, the ring interface 94, and the relay element 91. Due to a card failure, the ring interface 94 and/or the relay element 91 may be prevented from receiving power from the power bus. In such case, the ring interface 94 may be unable to detect the failure or to change the state of the relay element 91. In one exemplary embodiment, the relay element 91 is configured to automatically transition to the bypass state when it stops receiving electrical power from the power bus. Thus, the relay element 91 is transitioned to the bypass state even if the ring interface 94 is unable to control the state of the relay element 91. In other embodiments, other techniques for controlling the state of the ring element 91 are possible.

In one exemplary embodiment, when a line card 51-53 fails and transitions its relay element 91 to the bypass state, the other line cards discover such event and update the vectoring performed by such line cards in order to remove the tones associated with the failed line card from the crosstalk vectoring. For example, assume that the line card 51 communicates an interfering tone that interferes with a victim tone received by the line card 52. Further assume that the line card 51 fails causing the relay element 91 of the line card 51 to transition to the bypass state and preventing communication of the interfering tone across the subscriber lines 29. In such example, if the vector logic 77 of the line card 52 attempts to perform crosstalk vectoring to cancel the effects of the interfering tone from the victim tone based on the vectoring information in the vectoring stream 125, it is likely that the attempt to cancel the effects of the interfering tone will introduce noise into the victim tone, thereby degrading the quality of the victim tone. To prevent such an effect, the line card 52 is configured to detect the failure of the line card 51, and the vector logic 77 of the line card 52 is configured to disable crosstalk vectoring for the interfering tone communicated by the failed card 51. In such case, the vector logic 77 of the line card 52 is configured to perform crosstalk vectoring only for interfering tones communicated by the operational cards 52 and 53.

There are various techniques that can be used to enable one line card 51-53 to detect the failure of another. Various exemplary techniques for detecting a failed line card will be described in more detail below, but it should be emphasized that other techniques are possible in other embodiments.

In one exemplary embodiment, when a line card 51-53 fails, the vectoring field 131-133 allocated to the failed card is zeroed such that all of the data values in the slots of such field have a value of 0. Thus, the presence of all zeros in a vectoring field 131-133 indicates that the line card to which the field is allocated has failed. Further, if a vector logic 77 of any line card attempts to perform crosstalk vectoring based on the vectoring field of the failed card, multiplication of a zero value with any vectoring coefficient is equal to zero, and subtracting such a zero value from any symbol during a vectoring operation should not affect such symbol. Thus, the presence of the zeros in the vectoring field 131-133 of the failed card effectively disables crosstalk vectoring for the interfering tones associated with the failed card.

There are various techniques that can be used to zero the vectoring field 131-133 of the failed line card 51-53. In one exemplary embodiment, each line card 51-53 is configured to write zeros into all of the slots of the vectoring field 131-133 allocated to the next line card that is to receive the vectoring stream 125. Thus, when the vectoring stream 125 arrives at a given line card 51-53, the vectoring field 131-133 allocated to such card should be zeroed. If such line card is operational, the card's ring interface 94 overwrites the zeros with vectoring information from the card's vector logic 77. If such line card has failed such that its relay element 91 is in the bypass state, then the zeros are not overwritten.

As an example, as described above, the line card 51 is configured to insert into the field 131 vectoring information comprising symbols of tones communicated by the transceivers 55 of the card 51. As the vectoring stream 125 propagates along the ring connection 80, the ring interface 94 of the card 52 receives the vectoring field 131 and passes the vectoring information from such field to the card's vector logic 77, which uses such information in performing vectoring operations. Since the line card 53 that is to receive the vectoring field 131 next is not the one to which the field 131 is allocated, the ring interface 94 of the line card 52 does not overwrite the vectoring field 131 before transmitting it to the line card 53. The ring interface 94 of the line card 53, like the ring interface 94 of the line card 52, passes the information in the vectoring field 131 to its respective vector logic 77, which performs crosstalk vectoring based on such information. However, since the line card 51 that is to receive the vectoring field 131 next is the one to which the field 131 is allocated, the ring interface 94 of the line card 53 overwrites the vectoring information in the field 131 with all zeros. Note that the ring interface 94 of the line card 53 does not overwrite the vectoring field 132 allocated to the line card 52, and such ring interface 94 overwrites the vectoring field 133 allocated to the line card 53 with new vectoring information (e.g., new symbols received and/or to be transmitted by the transceivers 55 of the line card 53).

When the line card 51 receives the vectoring field 131 allocated to it, the time slots of the vectoring field 131 have been zeroed by the previous line card 53 from which it is received. If the line card 51 is operational, the card's ring interface 94 overwrites the vectoring field 131 with new vectoring information (e.g., new symbols received and/or to be transmitted by the transceivers 55 of the line card 51). However, if the line card 51 has failed such that its relay element 91 is in the bypass state, then the line card 51 does not overwrite the vectoring field 131. In such case, the vectoring field 131 received by line cards 52 and 53 is zeroed. The presence of the zeros in the field 131 indicates to the line cards 52 and 53 that the line card 51 has failed, and the vector logics 77 of the line cards 52 and 53 while performing crosstalk vectoring do not change any symbols based on the vectoring field 131.

In another exemplary embodiment, the control field 134 of the vectoring stream 125 is used to indicate when a line card 51-53 has failed. As an example, the control field 134 may have control bits respectively associated with the line cards 51-53. Further, the ring interface 94 of each line card 51-53 is configured to toggle the control bit associated with the line card each time the control field 134 is received by the ring interface 94. Thus, the other line cards can determine whether a given line card has failed based on whether the card's associated bit has been toggled since the last time that the control field 134 was transmitted around the ring.

As an example, assume that the line card 51 is operational such that its relay element 91 is in the pass-through state. When the ring interface 94 of the line card 51 receives the control field 134, the ring interface 94 toggles the control bit associated with the line card 51. That is, the ring interface 94 transitions the control bit to a logical 1 if the control bit is a logical 0 at reception, and the ring interface 94 transitions the control bit to a logical 0 if the control bit is a logical 1 at reception. For illustrative purposes, assume that associated control bit was a logical 0 the last time that the control field 134 was transmitted around the ring. Upon receiving the control field 134, the ring interface 94 of the line card 51 toggles the associated control bit to a logical 1. Thus, when the control field 134 is received by the line cards 52 and 53, the ring interfaces 94 of the line cards 52 and 53 determine that the control bit associated with the line card 51 has been toggled to a new value indicating that the line card 51 is operational. In such case, the line cards 52 and 53 use the vectoring field 131 allocated to the line card 51 to perform crosstalk vectoring, as described herein.

However, assume that the line card 51 fails just prior to receiving the control field 134 in which the associated bit is a logical 0. In such case, the relay element 91 is in the bypass state when the control field 134 arrives at the line card 51, and the ring interface 94 of the line card 51 does not toggle the associated control bit, which remains a logical zero value. Thus, when the line card 52 receives the control field 134, the ring interface 94 of the line card 52 determines that the line card 51 has failed since the associated control bit has not been toggled. In response to such determination, the ring interface 94 of the line card 52 overwrites the vectoring field 131 allocated to the failed card 51 with zeros. In such case, neither line card 52 nor 53 in performing crosstalk vectoring changes their respective tone symbols based on the vectoring field 131 allocated to the failed card 51.

Note that it is unnecessary for the vectoring field 131 allocated to the failed card 52 to be overwritten with zeros. As an example, each operational line card 52 and 53 may be configured to disable vectoring operations based on the vectoring field 131 in response to a determination that the line card 51 has failed without actually changing the values in the vectoring field 131 and/or changing the vectoring field 131 in other ways.

In addition, it should be noted that the effective length of the ring connection 80 between operational cards may be increased due to a transition of a relay element 91 to the bypass state. As an example, if the line card 51 fails, then the data transmitted across the segment 81 to the line card 51 bypasses the circuitry of the line card 51 and is received by the line card 52. Thus, the transmission distance of the data output via the ring port 87 of the line card 53 is effectively increased from approximately the length of the segment 81 to approximately the combined length of the segments 81 and 83. This additional length increases attenuation and delay. In designing the transmitters and receivers for the ring connection 80, their characteristics, such as transmit power, receive sensitivity, and timing, should be designed to accommodate the effective transmission distances that result when a given relay element 91 transitions from the pass-through state to the bypass state.

Once a line card failure is remedied, such as for example replacing the failed line card, the line cards 51-53 preferably resume normal operation and, thus, communicate across the ring connection 80 and perform vectoring as described above prior to the card failure. In the embodiment described above in which the line card preceding the failed line card overwrites the vectoring field of the failed line card with zeros, the new line card (which replaces the failed line card) may simply begin writing its symbols into the vectoring field allocated to it. The presence of non-zero values in such field indicates to the other line cards that the previous card failure has been remedied. In other embodiments, the new line card communicates control information via the control field 134 to indicate that the previous failure has been remedied and normal operation should resume. Various other techniques for resuming normal operation after remedying a card failure are possible.

An exemplary operation and use of the ring interface 94 of the line card 51 in processing a vectoring stream 125 will be described in more detail hereafter with particular reference to FIG. 6. The ring interfaces 94 of the other line cards 52 and 53 may be configured to operate similarly.

For illustrative purposes, assume that the control field 134 of the vectoring stream 125 has control bits respectively associated with the line cards 51-53 for indicating which of the line cards has failed, as described above. Assume that all of the line cards 51-53 are initially operational and, thus, have relay elements 91 in the pass-through state.

Figure 6:
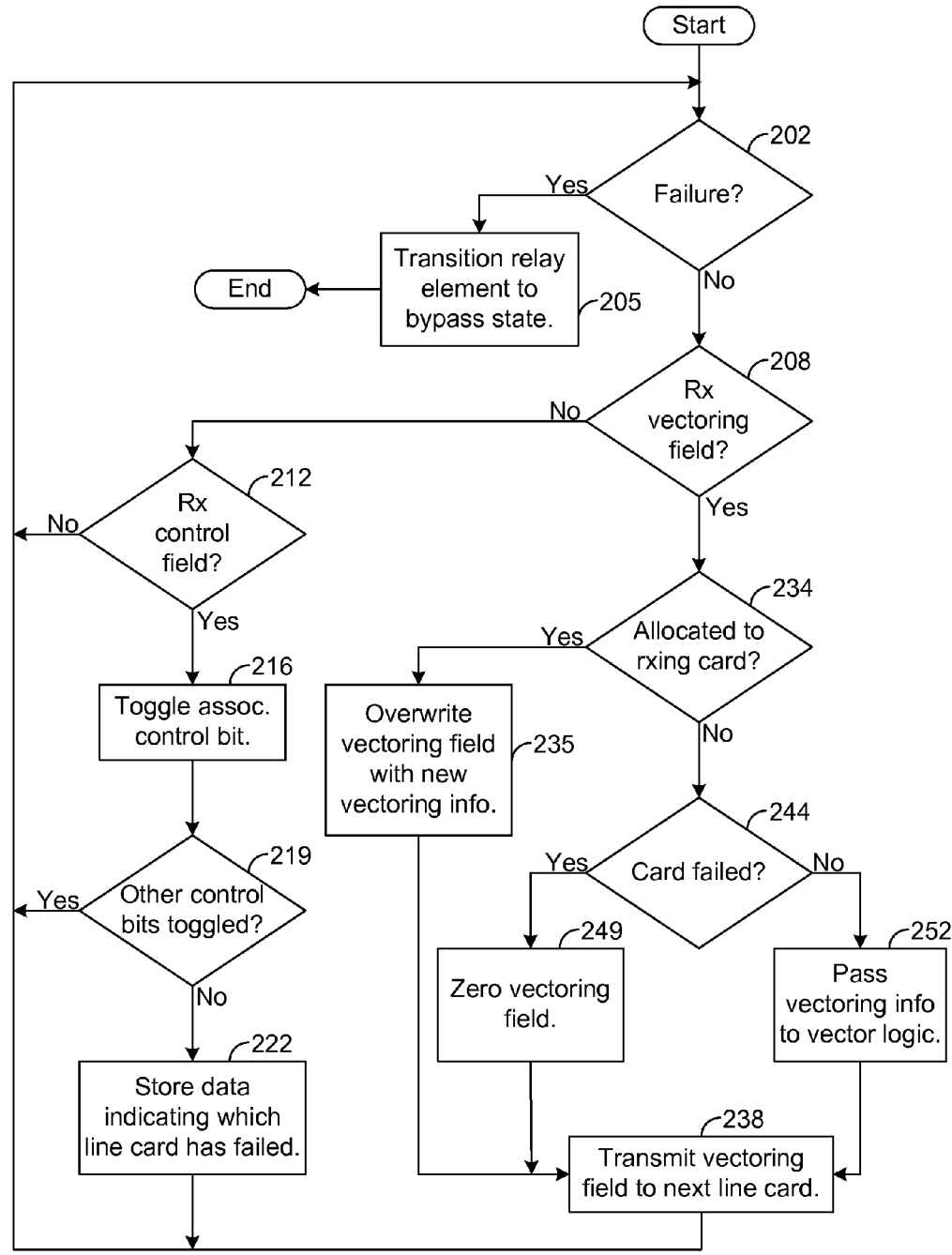
FIG. 6 is a flowchart illustrating an exemplary method of processing a vectoring stream, such as is depicted by FIG. 5.

As shown by block 202 of FIG. 6, the ring interface 94 of the line card 51 is configured to monitor the status of the line card 51 to detect a card failure. If the ring interface 94 detects such a failure, the ring interface 94 causes the relay element 91 of the line card 51 to transition to the bypass state, as shown by block 205 of FIG. 6. Note that the relay element 91 may also automatically transition to the bypass state if power is removed from the relay element 91, such as may occur during a power source failure.

As shown by block 208 of FIG. 6, the ring interface 94 of the line card 51 determines if it has newly received a vectoring field 131-133 from the ring connection 80. If not, the ring interface 94 determines if it has newly received the control field 134 from the ring connection 80, as shown by block 212 of FIG. 6. If so, the ring interface 94 toggles the control bit of the field 134 associated with the line card 51, as shown by block 216 of FIG. 6, thereby indicating that the line card 51 is operational. As shown by block 219 of FIG. 6, the ring interface 94 also checks the other control bits of the control field 134 to determine whether any of such control bits have not been toggled since the last time that the control field 134 was transmitted from the line card 51. If any such bit has not been toggled, the ring interface 94 determines that the line card 52 or 53 associated with the non-toggled bit has failed and stores data indicative of such failure, as shown by block 222 of FIG. 6. As will be described in more detail below, such data will be used to determine when to zero a vectoring field allocated to the failed card.

Upon newly receiving a vectoring field 131-133, the ring interface 94 determines whether the received vectoring field is allocated to the line card 51, as shown by block 234. If so, the ring interface 94 overwrites the vectoring field 131 with new vectoring information from the card's vector logic 77 and transmits the field 131 to the next line card 52 via the ring connection 80, as shown by blocks 235 and 238 of FIG. 6. Specifically, the ring interface 94 inserts into the time slots of the vectoring field 131 tone symbols that are to be transmitted or have been received by the transceivers 55 of the line card 51.

If the received vectoring field is not allocated to the line card 51, then the ring interface 94 determines, as shown by block 244 of FIG. 6, whether the line card 52 or 53 to which the vectoring field is allocated has failed based on the data stored via block 222. If such card 52 or 53 has failed, then the ring interface 94 of the line card 51 zeros the vectoring field by overwriting it with all zeros, as shown by block 249 of FIG. 6. If such card 52 or 53 has not failed, then the ring interface 94 of the line card 51 passes the vectoring information from the received vectoring field to the vector logic 77 of the line card 51, as shown by block 652 of FIG. 6, so that the vector logic 77 can perform crosstalk vectoring based on such vectoring information. After either zeroing the received vectoring field in block 249 or passing the vectoring information from the received vectoring field to the vector logic 77 in block 252, the ring interface 94 of the line card 51 transmits the vectoring field to the next line card 52 via the ring connection 80, as shown by block 238.

By implementing a similar process at each line card 51-53, vectoring information is passed from card-to-card around the ring formed by the ring connection 80 and cards 51-53. If a line card fails, its respective relay element 91 is transitioned to the bypass state such that the vectoring information of the operational cards continues to be communicated among the operational cards bypassing the failed card. Thus, the card failure does not prevent the operational cards from receiving vectoring information for performing crosstalk vectoring.

It should be emphasized that the configurations and techniques described herein for handling card failures in a multi-card vectoring group are exemplary, and various changes and modifications to the disclosed embodiments would be apparent to a person of ordinary skill in the art. As an example, as will be described in more detail below, a card failure may be handled by transmitting vectoring information in opposite directions around the ring. In yet other embodiments, other techniques for handling card failures are possible.

Figure 7:
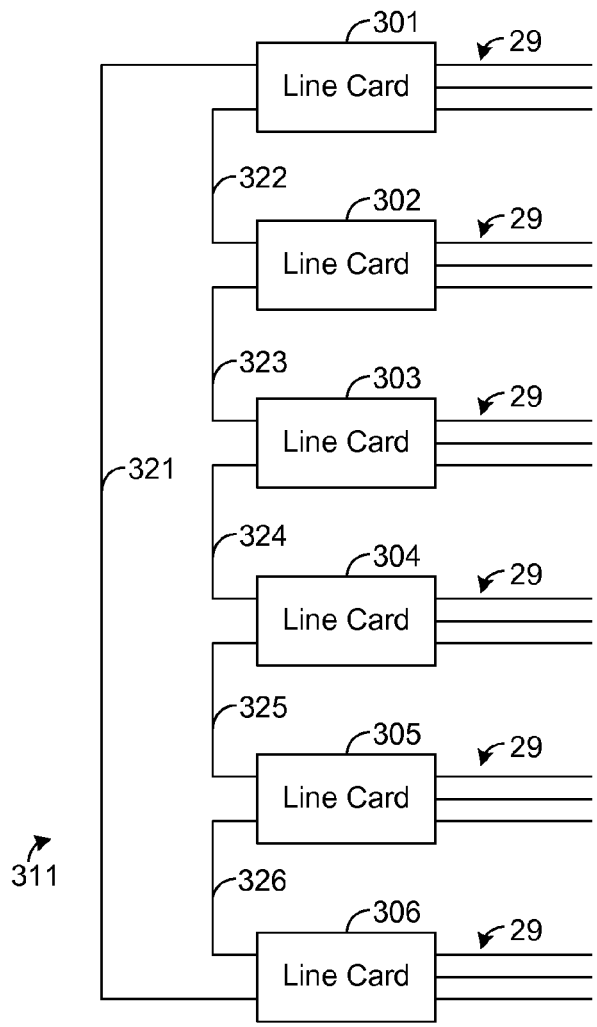
FIG. 7 is a block diagram illustrating an exemplary embodiment of a group of line cards implemented at a network access point, such as is depicted by FIG. 1.

FIG. 7 depicts an exemplary embodiment of six line cards 301-306 coupled via a ring connection 311 similar to the line cards 51-53 and ring connection 80 of FIG. 2, though other numbers of line cards 301-306 may be implemented in other embodiments. Such line cards 301-306 may be implemented at the network access point 25 (FIG. 1) in addition to or in lieu of the cards 51-53 shown by FIG. 2. The ring connection 311 comprises a plurality of segments 321-326 that are coupled between the line cards 301-306, as shown. Each line card 301-306 may be configured like the line cards 51-53 shown by FIG. 2, though other configurations of the line cards 301-306 are possible in other embodiments. Thus, as described above for the line cards 51-53 of FIG. 2, the line cards 301-306 are configured to transmit a vectoring stream via the ring connection 311. Further, on a network side, each line card 301-306 may be coupled to the switching element 71 (FIG. 2), like the line cards 51-53.

When a line card 301-306 fails, the other operational line cards are configured to bypass the failed card with the vectoring stream communicated across the ring connection 311. For example, the line cards 301-306 may have relay elements 91, like the line cards 51-53, such that the failed card is bypassed by transitioning its respective relay element 91 to the bypass state. However, in another exemplary embodiment, the line cards 301-306 do not have a relay element 91, and the failed card is bypassed via other techniques. For example, as will be described in more detail hereafter, the failed line card can be bypassed by transmitting the vectoring stream in opposite directions around the ring.

Figure 8:
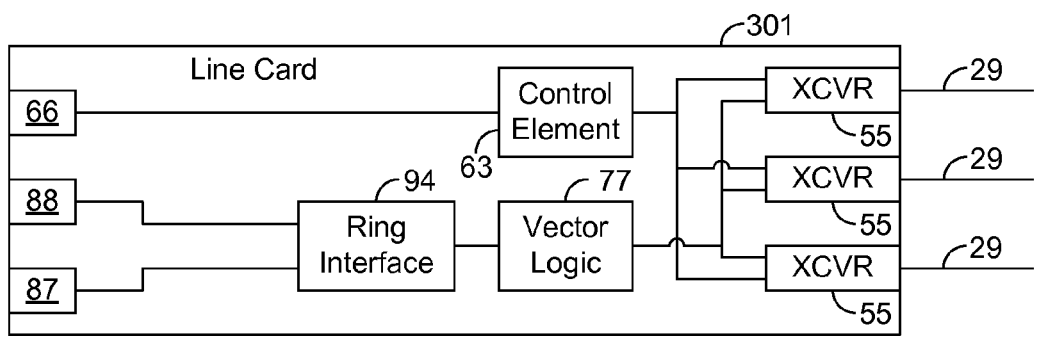
FIG. 8 is a block diagram illustrating an exemplary embodiment of a line card, such as is depicted by FIG. 7.

FIG. 8 depicts an exemplary embodiment of a line card 301, which does not have a relay element 91. Except for the missing relay element 91, the exemplary line card 301 of FIG. 8 has the same components as the line cards 51-53. As shown by FIG. 8, the ring interface 94 is coupled directly to the ring ports 87 and 88. The other line cards 302-306 may be configured like the exemplary line card 301 shown by FIG. 8.

Figure 9:
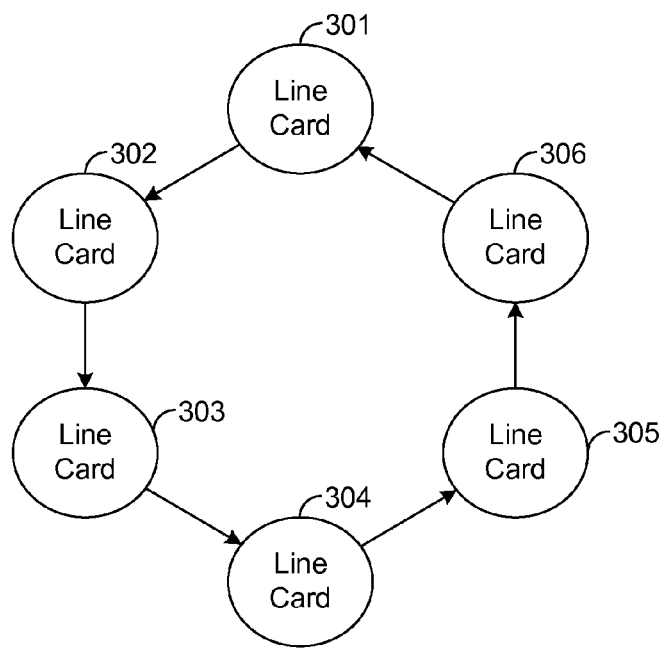
FIG. 9 is a block diagram illustrating an exemplary flow of a vectoring stream for a plurality of line cards, such as is depicted by FIG. 7.

FIG. 9 depicts an exemplary data flow for the line cards 301-306. In the exemplary embodiment shown by FIG. 9, the vectoring stream is transmitted in the counterclockwise direction around the ring, though the vectoring stream may be normally transmitted in the clockwise direction around the ring in other embodiments. When a card failure occurs, the failure is detected by another line card, referred to hereafter as the "protect card," that is immediately prior to the failed line card (i.e., that transmits the vectoring stream directly to the failed line card). When the protect card receives data from the ring connection 311, the protect card transmits the data in the opposite direction away from the failed card. Thus, the vectoring stream 125 is communicated in both directions around the ring so that each operational line card receives the vectoring stream.

Note that there are various techniques that can be used to communicate data in both directions. In this regard, a different physical medium can be used to transmit the vectoring stream in one direction relative to the other direction. In such case, there are essentially two ring connections. One of the ring connections carries data in one direction while the other ring connection carries data in the opposite direction. In another embodiment, the same segments 321-326 (FIG. 7) can be used to carry data in both directions. In such an embodiment, the data in one direction may be transmitted at a different frequency (frequency division multiplexing) or at different times (time division multiplexing) so that the data flow in one direction does not interfere with the data flow in the opposite direction.

To better illustrate the operation of the line cards 301-306, assume that the vectoring stream is being transmitted counterclockwise, as shown by FIG. 9, when the line card 302 fails. Upon such failure, the line card 303 stops receiving the vectoring stream from the line card 302. After a predefined amount of time has passed without receiving data from the line card 302, the ring interface 94 (FIG. 8) of the line card 303 determines that the card 302 has failed. In response, such ring interface 94 communicates a failure notification to the other line cards 301 and 304-306 informing such other line cards of the failure. As an example, the ring interface 94 of the line card 303 may be configured to transmit the failure notification via a control field of the vectoring stream. In other embodiments, other techniques for discovering and/or communicating the failure of the line card 302 are possible.

Figure 10:
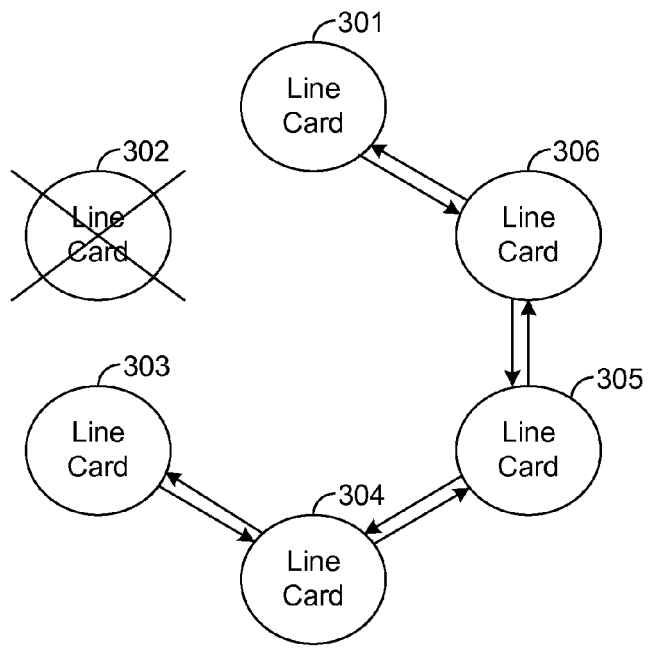
FIG. 10 is a block diagram illustrating an exemplary flow of a vectoring stream for a plurality of line cards, such as is depicted by FIG. 9, after one of the line cards has failed.

Upon learning of the failure of the next line card 302 in the ring, the ring interface 94 (FIG. 8) of the line card 301 immediately prior to the failed line card 302 begins to transmit the vectoring stream in the opposite direction around the ring such that the vectoring stream is transmitted around the ring in the clockwise direction, as shown by FIG. 10. Further, the vectoring field allocated to the failed line card 302 is zeroed, as described above, so that the operational cards 301 and 303-306 do not modify tone symbols in an attempt to cancel crosstalk associated with the failed line card 302. Zeroing of the vectoring field allocated to the failed line card 302 may be performed by the ring interface 94 of the line card 301 or any of the other operational line cards 303-306.

Note that the line card 303 that is immediately after the failed line card 302 continues to transmit the vectoring stream in the same direction as before the card failure. Thus, when the line card 303 receives from the line card 304 a vectoring field allocated to another operational line card 301 or 304-306, the ring interface 94 (FIG. 8) of the line card 303 transmits the vectoring field to the next line card 304 as it did prior to the failure of the line card 302. Accordingly, the vectoring stream 125 travels in both directions among the operational cards 301 and 303-306 effectively bypassing the failed line card 302.

Further, as described above for the embodiment depicted by FIG. 2, when a given line card 301 or 303-306 receives the vectoring field allocated to it, the card overwrites such vectoring field with new vectoring information. However, each of the line cards 304-306 between the two line cards 301 and 303 that are adjacent to the failed line card 302 in the ring preferably changes the vectoring field allocated to it for only one direction of the vectoring stream 125 so that it can be ensured that each operational line card 301 and 303-306 has access to each symbol communicated by the stream 125.

For example, in the embodiment depicted by FIG. 10, each line card 304-306 may be configured to overwrite the vectoring field allocated to it only when the vectoring field is received in the clockwise direction. In this regard, assume that a vectoring field allocated to the line card 304 is received from the line card 305. In such case, the line card 304 does not overwrite the vectoring field but rather passes its allocated vectoring field unchanged to the next line card 303. However, if a vectoring field allocated to the line card 304 is received from the line card 303, then the line card 304 overwrites the vectoring field with new vectoring information. Accordingly, the vectoring information inserted into the vectoring stream 125 by the line card 304 should be received by all of the other operational line cards 301, 303, 305, and 306 before it is overwritten by the line card 304.

In the example shown by FIG. 10, the line cards 301 and 303 adjacent to the failed line card 302 receive the vectoring stream in only one direction. Thus, such line cards 301 and 303 are preferably configured to overwrite their respective vectoring fields upon receipt. For example, the line card 303 is configured to update the vectoring field allocated to it when such vectoring field is received from the line card 304, and the line card 301 is configured to update the vectoring field allocated to it when such vectoring field is received from the line card 306.

In one exemplary embodiment, the line cards 301-306 may be configured to transmit the vectoring stream in both directions around the ring in normal operation. When a failure occurs, the cards 301-306 may then transmit the vectoring stream as shown by FIG. 10 without losing vectoring information from such stream due to the card failure. For example, the line card 301 could be configured to detect the failure of the line card 302 when it stops receiving the vectoring stream from the line card 302. In such case, the line card 301 may begin operating as described above relative to FIG. 10 without having to receive a failure notification from the line card 303.

Once a line card failure is remedied, such as for example replacing the failed line card, the line cards 301-306 preferably resume normal operation and, thus, communicate across the ring and perform vectoring as described above prior to the card failure. As an example, a new line card that replaces the previously failed line card may be configured to transmit via a control filed of the vectoring stream a notification that the line card is operational. In response to such notification, the other lines cards may be configured to begin communicating around the ring, as described above prior to the failure. Various other techniques for resuming normal operation after remedying a card failure are possible.

An exemplary operation and use of the ring interface 94 of the line card 301 in processing a vectoring stream will be described in more detail hereafter with particular reference to FIG. 11. The ring interfaces 94 of the other line cards 302-306 may be configured to operate similarly.

For illustrative purposes, assume that all of the line cards 301-306 are initially operational and transmit a vectoring stream counterclockwise, as shown by FIG. 9. As shown by block 401 of FIG. 11, the ring interface 94 of the line card 301 determines if it has newly received a vectoring field from the previous line card 306 via the ring connection 311. If not, the ring interface 94 determines if it has newly received a control field from the previous line card 306 via the ring connection 311, as shown by block 404 of FIG. 11. If so, the ring interface 94 processes control information within such field as may be appropriate, as shown by block 407 of FIG. 11. After processing control information in block 407, the ring interface 94 of the line card 301 determines whether the next line card 302 has failed, as shown by block 408 of FIG. 11. If not, the ring interface 94 transmits the control field to the next line card 302, as shown by block 409 of FIG. 11. However, if the next line card 302 has failed, then the ring interface 94 of the line card 301 instead transmits the control field to the previous line card 306, as shown by block 410 of FIG. 11.

If the ring interface 94 of the line card 301 determines in block 401 that it has received a vectoring field, the ring interface 94 then determines whether the received vectoring field is allocated to the line card 301, as shown by block 411. If so, the ring interface 94 overwrites the vectoring field with new vectoring information from the vector logic 77 of the line card 301, as shown by block 416 of FIG. 11. Specifically, the ring interface 94 inserts into the time slots of the vectoring field tone symbols that are to be transmitted or have been received by the transceivers 55 of the line card 301.

Figure 11:
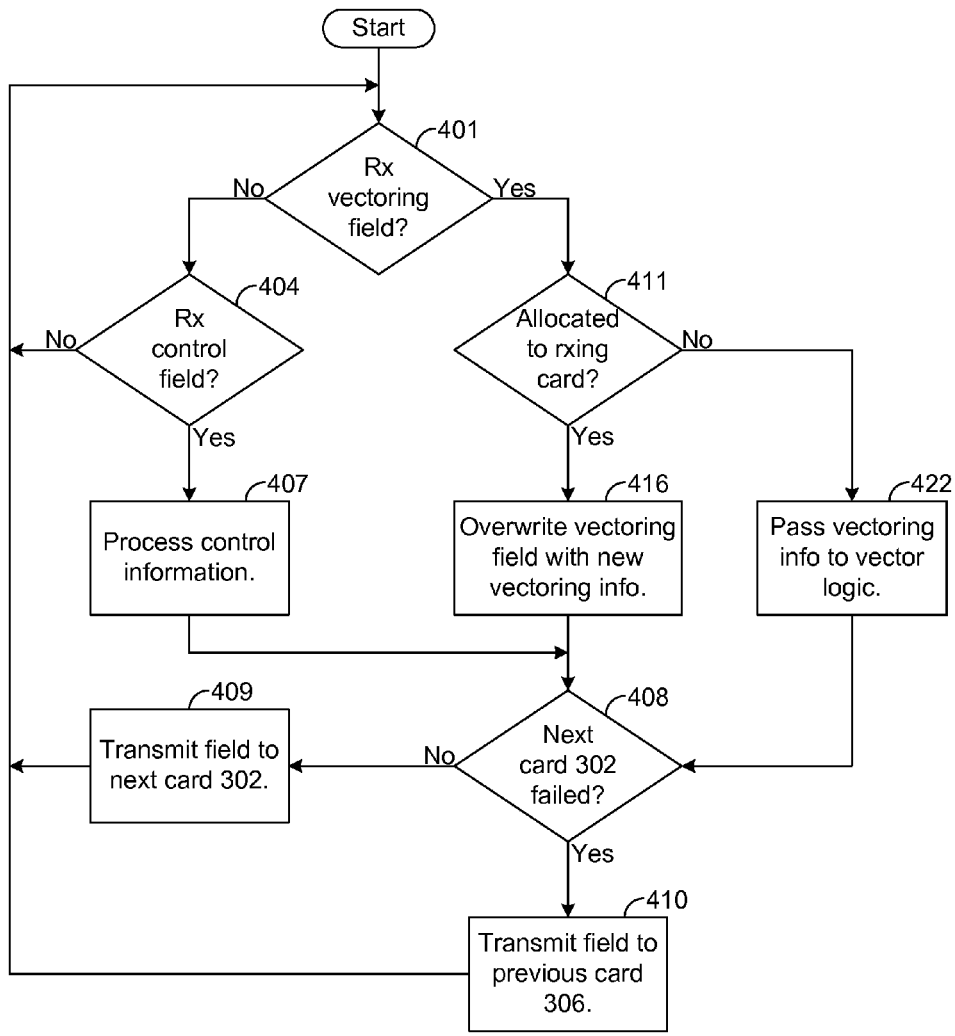
FIG. 11 is a flowchart illustrating an exemplary method of processing a vectoring stream.

If the received vectoring field is not allocated to the line card 301, then the ring interface 94 passes the vectoring information from the received vectoring field to the vector logic 77 of the line card 301, as shown by block 422 of FIG. 11, so that the vector logic 77 can perform crosstalk vectoring based on such vectoring information. After overwriting the received vectoring field in block 416 or passing the vectoring information from the received vectoring field to the vector logic 77 in block 422, the ring interface 94 of the line card 301 determines whether the next line card 302 has failed, as shown by block 408 of FIG. 11. If not, the ring interface 94 transmits the vectoring field to the next line card 302, as shown by block 409 of FIG. 11. However, if the next line card 302 has failed, then the ring interface 94 of the line card 301 instead transmits the vectoring field to the previous line card 306, as shown by block 410 of FIG. 11.

Accordingly, once the line card 302 fails, the line card 301 reverses the direction in which it transmits the data from the connection 311 such that the vectoring stream is transmitted in both directions around the ring. As such, each operational line card 301 and 303-306 should receive the vectoring stream so that crosstalk vectoring performed by the operational cards 301 and 303-306 can continue despite the failure of the line card 302.

It should be emphasized that the embodiments described above are exemplary, and various changes and modifications to the described embodiments would be apparent to a person of ordinary skill upon reading this disclosure.

Now, therefore, the following is claimed:

1. A network access point, comprising:
a switching element;
a ring connection;
a first line card coupled to the switching element, the ring connection, and a first plurality of subscriber lines, the first line card configured to cancel crosstalk affecting first symbols communicated across the first plurality of subscriber lines based on a vectoring stream carried by the ring connection, thereby providing first crosstalk-compensated symbols, the first line card further configured to insert the first symbols into the vectoring stream and to transmit the first crosstalk-compensated symbols to the switching element;

a second line card coupled to the switching element, the ring connection, and a second plurality of subscriber lines, the second line card configured to cancel crosstalk affecting second symbols communicated across the second plurality of subscriber lines, thereby providing second crosstalk-compensated symbols, the second line card further configured to insert the second symbols into the vectoring stream and to transmit the second crosstalk-compensated symbols to the switching element, wherein the second line card is configured to receive the first symbols from the vectoring stream and to maintain a vectoring coefficient corresponding to a tone of one of the first symbols, wherein the second line card is configured to combine the one of the first symbols with the vectoring coefficient, thereby providing an estimate of crosstalk induced by the one of the first symbols and interfering with one of the second symbols, and wherein the second line card is configured to combine the estimate with the one of the second symbols, thereby cancelling the crosstalk induced by the one of the first symbols; and a third line card coupled to the switching element, the ring connection, and a third plurality of subscriber lines, the third line card configured to cancel crosstalk affecting third symbols communicated across the third plurality of subscriber lines, thereby providing third crosstalk-compensated symbols, the third line card further configured to insert the third symbols into the vectoring stream and to transmit the third crosstalk-compensated symbols to the switching element, wherein the line cards are configured to transmit the vectoring stream in a first direction around the ring connection and in a second direction around the ring connection opposite to the first direction thereby causing the vectoring stream to bypass the first line card when a failure occurs on the first line card.

2. The network access point of claim 1, wherein the second line card comprises a ring interface coupled to the ring connection, and wherein the second line card is configured to transmit the vectoring stream in the second direction in response to a detection of the failure.

3. The network access point of claim of claim 2, wherein the second line card is adjacent to the first line card in a ring formed by the ring connection and the first, second, and third line cards.

4. The network access point of claim 1, wherein the second line card is adjacent to the first line card in a ring formed by the ring connection and the first, second, and third line cards, wherein the vectoring stream has time slots allocated to the first line card, wherein the first line card is configured to insert the first symbols into the time slots allocated to the first line card, and wherein the second line card is configured to overwrite the time slots allocated to the first line card.

5. The network access point of claim 1, wherein the switching element is configured to multiplex the first, second, and third crosstalk-compensated symbols thereby providing a multiplexed data stream for transmission to a network.

6. A method for use at a network access point, comprising:
communicating first symbols across a first plurality of subscriber lines coupled to a first line card;
cancelling crosstalk affecting the first symbols based on a vectoring stream carried by a ring connection connecting at least the first line card, a second line card, and a third line card, thereby providing first crosstalk-compensated symbols;
inserting the first symbols into the vectoring stream by the first line card;
transmitting the first cross-talk compensated symbols from the first line card to a switching element at the network access point;
communicating second symbols across a second plurality of subscriber lines coupled to the second line card;
cancelling crosstalk affecting the second symbols based on the vectoring stream, thereby providing second crosstalk-compensated symbols;
inserting the second symbols into the vectoring stream by the second line card;
transmitting the second cross-talk compensated symbols from the second line card to the switching element;
receiving the first symbols from the vectoring stream at the second line card;
maintaining, at the second line card, a vectoring coefficient corresponding to a tone of one of the first symbols;
combining the one of the first symbols with the vectoring coefficient, thereby providing an estimate of crosstalk induced by the one of the first symbols and interfering with one of the second symbols;
combining the second estimate with the one of the second symbols, thereby cancelling the crosstalk induced by the one of the first symbols;
communicating third symbols across a third plurality of subscriber lines coupled to the third line card;
cancelling crosstalk affecting the third symbols based on the vectoring stream, thereby providing third crosstalk-compensated symbols;
inserting the third symbols into the vectoring stream by the third line card;
transmitting the third cross-talk compensated symbols from the third line card to the switching element;
transmitting the vectoring stream in a first direction around the ring connection; and
transmitting the vectoring stream in a second direction around the ring connection opposite to the first direction thereby causing the vectoring stream to bypass the first line card when a failure occurs on the first line card.

7. The method of claim 6, further comprising detecting the failure, wherein the transmitting the vectoring stream in the second direction is performed in response to the detecting.

8. The method of claim 7, wherein the transmitting the vectoring stream in the second direction is performed at the second line card, and wherein the second line card is adjacent to the first line card in a ring formed by the ring connection and the first, second, and third line cards.

9. The method of claim 6, wherein the second line card is adjacent to the first line card in a ring formed by the ring connection and the first, second, and third line cards, wherein the method further comprises:
allocating times slots of the vectoring stream to the first line card;
inserting the first symbols into the time slots allocated to the first line card; and
overwriting the time slots allocated to the first line card at the second line card.

10. The method of claim 6, wherein the vectoring stream has a first plurality of time slots allocated to the first line card, a second plurality of time slots allocated to the second line card, and a third plurality of time slots allocated to the third line card.

11. The method of claim 10, wherein the first line card is configured to insert the first symbols into the first plurality of time slots, wherein the second line card is configured to insert the second symbols into the second plurality of time slots, and wherein the third line card is configured to insert the third symbols into the third plurality of time slots.

12. The method of claim 11, wherein the second line card is configured to use the first symbols inserted into the first plurality of time slots for cancelling crosstalk from the second symbols.

* * * * *